United States Patent
Taylor et al.

(10) Patent No.: US 9,345,985 B2
(45) Date of Patent: May 24, 2016

(54) DEVOLATILIZATION APPARATUS AND PROCESS

(71) Applicant: Dow Global Technologies LLC, Midland, MI (US)

(72) Inventors: Craig S. Taylor, Lake Jackson, TX (US); Ravindra S. Dixit, Lake Jackson, TX (US); Robert P. Shirtum, Rock Springs, TX (US)

(73) Assignee: Dow Global Technologies LLC, Midland, MI (US)

( * ) Notice: Subject to any disclaimer, the term of this patent is extended or adjusted under 35 U.S.C. 154(b) by 279 days.

(21) Appl. No.: 13/933,211

(22) Filed: Jul. 2, 2013

(65) Prior Publication Data
US 2013/0292064 A1 Nov. 7, 2013

Related U.S. Application Data

(62) Division of application No. 12/704,161, filed on Feb. 11, 2010, now Pat. No. 8,518,212.

(51) Int. Cl.
*B01D 1/22* (2006.01)
*A23P 1/12* (2006.01)
(Continued)

(52) U.S. Cl.
CPC ... *B01D 1/22* (2013.01); *A23P 1/12* (2013.01); *B01D 1/0047* (2013.01); *B01D 1/221* (2013.01); *B01D 3/06* (2013.01); *B01D 19/0036* (2013.01); *C08F 6/005* (2013.01); *C11D 17/041* (2013.01);
(Continued)

(58) Field of Classification Search
CPC ........ B01D 1/22; B01D 1/221; B01D 1/0047; B01D 3/06; B01D 19/0036; A23P 1/12; C11D 17/041; F28D 7/0041; F28D 9/0018; F28F 1/32; F28F 13/08; C08F 6/005
USPC .................. 159/47.1; 528/480–503
See application file for complete search history.

(56) References Cited

U.S. PATENT DOCUMENTS 2,411,186 A  11/1946 Boeckeler
3,014,702 A  12/1961 Oldershaw et al.
(Continued)

FOREIGN PATENT DOCUMENTS

WO  9524252 A1  9/1995
WO  9621836 A1  7/1996
(Continued)

OTHER PUBLICATIONS

Japanese Office Action dated Dec. 24, 2014 for counterpart Japanese Application No. 2013-552897, 6 pages.
(Continued)

*Primary Examiner* — Frances Tischler (57) ABSTRACT

Embodiments of the invention provide an apparatus or process for devolatilization of flowable materials (such as molten polymers with entrained or dissolved solvent or unreacted monomers or comonomers) using a plate heater having heating channels, the design or operation of which heating channels maintains the flowable material above its bubble point pressure during passage through a larger first zone and then induces flashing in, or downstream of, a smaller second zone of the heating channel. The apparatus enables a higher throughput per heating channel while achieving equivalent or better devolatilization, as compared to current devolatilization apparatus.

6 Claims, 5 Drawing Sheets

(51) Int. Cl.

| | | |
|---|---|---|
| *B01D 1/00* | (2006.01) | |
| *B01D 3/06* | (2006.01) | |
| *B01D 19/00* | (2006.01) | |
| *C08F 6/00* | (2006.01) | |
| *C11D 17/04* | (2006.01) | |
| *F28D 7/00* | (2006.01) | |
| *F28D 9/00* | (2006.01) | |
| *F28F 1/32* | (2006.01) | |
| *F28F 13/08* | (2006.01) | |

(52) U.S. Cl.
CPC ............ *F28D 7/0041* (2013.01); *F28D 9/0018* (2013.01); *F28F 1/32* (2013.01); *F28F 13/08* (2013.01)

(56) References Cited

U.S. PATENT DOCUMENTS

| | | |
|---|---|---|
| 3,060,505 A | 10/1962 | Brasie |
| 4,153,501 A | 5/1979 | Fink et al. |
| 4,421,162 A | 12/1983 | Tollar |
| 4,423,767 A | 1/1984 | Hay, II et al. |
| 4,564,767 A | 1/1986 | Charych |
| 4,808,262 A | 2/1989 | Aneja et al. |
| 5,084,134 A | 1/1992 | Mattiussi et al. |
| 5,453,158 A | 9/1995 | Cummings et al. |
| 5,861,474 A | 1/1999 | Weller et al. |
| 2005/0061481 A1 | 3/2005 | Kandlikar |
| 2009/0308253 A1 | 12/2009 | Washio |

FOREIGN PATENT DOCUMENTS

| | | |
|---|---|---|
| WO | 9803560 A1 | 1/1998 |
| WO | 0191877 A2 | 12/2001 |

OTHER PUBLICATIONS

Japanese Response to Office Action dated Sep. 4, 2014; from Japanese counterpart Application No. 2012-552897.
Japanese Office Action dated Apr. 23, 2014; from Japanese counterpart Application No. 2012-552897.
Instructions to Japanese Office Action dated Jul. 11, 2014; from Japanese counterpart Application No. 2012-552897.
C. G. Dumas, "Finite Element Modeling of Polymer Flow and Heat Transfer in Processing Equipment," Computer Applications in Applied Polymer Science II, American Chemical Society 1989, Chapter 40, pp. 523-536.
PCT Search Report and Written Opinion issued in PCT/US2011/022954, dated May 17, 2011.
Response to Japanese Office Action dated Dec. 24, 2014 filed Apr. 16, 2015 for counterpart Japanese Application No. 2012-552897, 5 pages.
EPO Office Action dated Apr. 17, 2015 for counterpart EPO Application No. 11704692.0, 4 pages.
EP Response to office action dated Aug. 11, 2015; from EP counterpart Application No. 11704692.0.

DEVOLATILIZATION APPARATUS AND PROCESS

REFERENCE TO RELATED APPLICATIONS

"This Application is a Division of Application 12/704,161 filed on Feb. 11, 2010, now granted as U.S. Pat. No. 8,518,212, which claims priority from U.S. Application No. 61/150,472, filed Feb. 6, 2009; each application is incorporated herein, in its entirety, by reference." to -- This Application is a Division of Application 12/704,161 filed on Feb. 11, 2010, now granted as U.S. Pat. No. 8,518,212, and is incorporated herein, in its entirety, by reference.

FIELD OF THE INVENTION

This invention relates to a devolatilization apparatus comprising a plate heat exchanger, and a related process for devolatilization of flowable materials at high throughputs.

BACKGROUND OF THE INVENTION

The removal of volatile components from a flowable material, referred to as "devolatilization," is a necessary step in several industrial processes, including the commercial manufacture of many polymers. In particular, where a polymer is produced from a solution of monomers, it is necessary to remove the solvent and unreacted monomers from the final product. For example, residual monomer and volatiles must be removed from the polymer product in the bulk or solution polymerization of polystyrene, styrene/acrylonitrile copolymers (SAN), or rubber-modified styrene/acrylonitrile copolymers (ABS, AES, etc.), and olefin-based polymers (such as polypropylene, polyethylene, olefin block copolymers, and EPDM).

The separation of the volatile components from a molten polymer solution is generally achieved by evaporation, the process consisting of heating the polymer solution at a temperature higher than the boiling point of the volatile components and removing the evolved volatile components. One method of devolatilization involves passing the polymer solution through a heat exchanger and then into a zone of reduced pressure. Suitable heat exchangers for this purpose, such as those referred to as flat plate heaters or flat plate heat exchangers, comprise a multiplicity of heated plates arranged in stacks or layers, with various heating channels connecting the interior (into which a polymer solution is supplied) and exterior portions of the heater for passage of the solution to be heated and devolatilized. Improved performance is attained by placing the heater within a closed shell which is partially evacuated.

Previous designs of flat plate heaters have been disclosed in U.S. Pat. Nos. 3,014,702; 4,153,501; 4,421,162; 4,423,767; 4,564,063; 4,808,262; 5,084,134; 5,453,158; and 5,861,474, and also in PCT publication WO96/21836.

In order to compete in the global economy, it has become necessary to install polymerization plants having larger capacities (in some cases exceeding 330,000 metric tons per annum, 330 KTA). In plants of that size, even the most efficient conventional designs (such as those disclosed in U.S. Pat. No. 5,453,158) typically reach or exceed the physical size limitations of the flat plate heaters which can be constructed economically and operated successfully, as a practical matter. In particular, those conventional designs are inadequate to achieve the both the necessary degree of devolatilization and the high throughputs of these larger plants, and therefore those heat exchangers have become the capacity-limiting component in the design of devolatilization apparatus for larger polymerization plants.

Thus a need exists for an improved devolatilization apparatus incorporating a plate heat exchanger having an improved heating channel design, which design would allow higher efficiency and throughput, while achieving sufficiently low residual volatiles in the devolatilized material.

SUMMARY OF THE INVENTION

This invention provides a devolatilization apparatus comprising:
  a supply means for supplying a pressurized flowable material comprising at least one liquid or flowable solid, as well as at least one entrained or dissolved volatile component, which flowable material is characterized by a bubble point pressure which varies with the temperature of the flowable material,
  a collection-and-volatile-separation means, and
  a multiplicity of plates defining a plurality of heating channels, each channel having two zones comprising:
    a first zone having (1) an average hydraulic radius, and (2) an inlet adapted to receive the flowable material from the supply means, and
    a second zone constituting the remainder of each channel, which second zone is adapted to receive the flowable material from the first zone and has at least one outlet adapted to discharge the flowable material into the collection-and-volatile-separation means, wherein at least a portion of the second zone has a smaller hydraulic radius than the average hydraulic radius of the first zone, and
    wherein the design or operation of at least some of the heating channels is such that the pressure of the flowable material at essentially all positions within the first zone of those heating channels exceeds the bubble point pressure of the flowable material.

This invention also provides a devolatilization apparatus comprising:
  (a) a pump for supplying a pressurized flowable material comprising at least one molten polymer and at least one dissolved or entrained volatile component, which flowable material is characterized by a bubble point pressure which varies with the temperature of the flowable material,
  (b) a collection-and-volatile-separation vessel, and
  (c) a multiplicity of plates defining a plurality of heating channels, each channel having a substantially uniform height and having two zones comprising:
    a first zone having (1) an average hydraulic radius, and (2) an inlet adapted to receive the flowable material from the pump, and
    a second zone constituting the remainder of each channel, which second zone is adapted to receive the flowable material from the first zone and has at least one outlet adapted to discharge the flowable material into the collection-and-volatile-separation vessel, wherein at least a portion of the second zone has a smaller hydraulic radius than the average hydraulic radius of the first zone, and
    wherein the design or operation of at least some of the heating channels is such that the pressure of the flowable material at essentially all positions within the first zone of the heating channels exceeds the bubble point pressure of the flowable material, and
  (d) a plurality of heating elements adapted to heat at least some of the plates so as to increase the temperature of the flowable material as it flows through the heating channels.

This invention also provides a process for the devolatilization of a flowable material comprising a liquid or flowable solid, as well as at least one entrained or dissolved volatile component, which process comprises passing that flowable material through the devolatilization apparatus described above while operating under devolatilization conditions so as to separate the volatile component and produce a substantially devolatilized product.

Further, this invention provides a method for the manufacture of a polymer from at least one monomer and optionally one or more comonomers in the presence of a supported or unsupported catalyst, wherein the polymer being produced is dissolved or suspended within a solvent, and wherein a flowable material comprising the polymer in molten form, the solvent, and one or more unreacted monomers or comonomers is processed to remove a majority of the solvent and unreacted monomer or comonomer from the molten polymer, the improvement comprising using the devolatilization apparatus of claim 1 to process the flowable material so as to produce a substantially devolatilized polymer product having a residual content of the solvent and the unreacted monomer or comonomer of less than 2000 wppm.

DESCRIPTION OF EMBODIMENTS OF THE INVENTION

Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

Definitions

By "substantially uniform," as used with respect to a dimension (such as width or height) or a cross-sectional area of zone within a heating channel, is meant that the same is either not converging nor diverging at all, or is converging and/or diverging by no more than ten percent of the average of that dimension.

"Polymer" refers to a compound prepared by polymerizing monomers, whether of the same or a different type of monomer. The generic term "polymer" embraces the terms "oligomer," "homopolymer," "copolymer," "terpolymer" as well as "interpolymer."

"Interpolymer" refers to polymers prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

"Oligomer" refers to a polymer molecule consisting of only a few monomer units, such as a dimer, trimer, or tetramer.

"Bubble point pressure" means the highest pressure at which the first bubble of vapor is formed at a given temperature.

"Hydraulic radius" as used with respect to a zone of a heating channel, means the ratio of (a) the cross-sectional area of a conduit in which a fluid is flowing to (b) the total fluid-wetted perimeter of that conduit.

"Flowable solid" means a material (such as a slurry or a dispersion or a suspension containing particulate solids) which although comprising some normally solid components is flowable through the heating channels of the apparatus of this invention under the conditions of operation or the design conditions.

"Thermal-fluid" means a fluid useful to convey heat from a heating source, and transfer that heat by indirect heat exchange to a plate of the apparatus of this invention. Suitable thermal-fluids include steam, hot oils, and other thermal-fluids, such as those marketed by The Dow Chemical Company under the trademark "DOWTHERM."

Devolatilization of Flowable Materials

The apparatus and process of this invention are suitable for devolatilizing a wide variety of flowable materials, and they are particularly suitable for devolatilizing viscous flowable materials. Suitable flowable materials include normally liquid compositions in which are entrained or dissolved volatile components, as well as normally solid materials (such as polymers or food stuffs) having entrained or dissolved volatile components, but which are flowable under the conditions in the devolatilization apparatus. Such flowable materials include, but are not limited to, polymeric products typically produced in a solution-polymerization process or a slurry-polymerization process, as well as any other flowable material comprised of (a) a liquid or flowable solid and (b) entrained or dissolved volatile components.

The liquid or flowable solid content of the flowable material may be any one or more of a variety of materials. Examples of such liquid or flowable solids include: molten polymers, proteins, methylene diisocyanates, toluene diisocyanates, cheeses, sausages, dressings, candies, chocolates, molasses, other food products, waxes, heavy oils, tars, asphalts, other construction materials (such as clay, plaster, cement or aggregate in water), tree saps, pulp, paper, soaps, liquid detergents, biomass, adhesives, pharmaceuticals, other viscous liquids, or any combination thereof. Flowable materials also include flowable solids (such as a slurry or a dispersion or a suspension containing particulate solids) which although comprising some normally solid components is flowable through the heating channels of the apparatus of this invention under the conditions of operation or the design conditions.

The apparatus and process of this invention are preferred for the devolatilization of molten polymers, such as olefin-based polymers, vinylaromatic polymers, condensation polymers, polyols, high molecular weight epoxies, and the like. For the purpose of this invention, vinylaromatic polymers are to be understood as being all homopolymers and copolymers (including graft copolymers) of one or more vinylaromatic monomers and blends thereof with additional polymers. Examples of such polymers include polystyrene, rubber modified or impact-resistant polystyrene, styrene/acrylonitrile copolymers (including rubber-modified versions thereof, such as ABS or AES copolymers), and blends of the foregoing with other polymers such as polycarbonate or polyphenylene ether polymers. Preferred vinylaromatic polymers are polystyrene, impact modified polystyrene (HIPS) and ABS.

Examples of olefin-based polymers include homopolymers and copolymers (including graft copolymers) of one or more $C_2$ to $C_{10}$ olefins, including but not limited to, polypropylene and other propylene-based polymers, polyethylenes and other ethylene-based polymers, and olefin block copolymers. Such olefin-based polymers include, but are not limited to, high density polyethylenes (HDPE), low density polyethylenes (LDPE), linear low density polyethylenes (such as the LLDPE marketed by The Dow Chemical Company under the trademark "DOWLEX"), enhanced polyethylenes (such as those marketed by The Dow Chemical Company under the trademark "ELITE"), metallocene-catalyzed linear or substantially linear ethylene copolymers (such as those marketed by The Dow Chemical Company under the trademarks "AFFINITY" and "ENGAGE" and those marketed by ExxonMobil Chemical Company under the trademarks "Exact" and "Exceed"), propylene-based copolymers (such as those marketed by The Dow Chemical Company under the trademark "VERSIFY" and those marketed by ExxonMobil Chemical Company under the trademark "Vistamaxx"), and olefin-block copolymers (such as those marketed by The Dow Chemical Company under the trademark "INFUSE"), and other polyolefin elastomers (such as the EPDM marketed by The Dow Chemical Company under the trademark "NORDEL" or "NORDEL IP").

Other examples of polymers include various oligomers, such as the advanced epoxy resins available from The Dow Chemical Company under the trademark "DER", and the novolac resins available from The Dow Chemical Company under the trademark "DEN."

The molecular weights and melt index (I2, as measured by ASTM method D-1238) of such polymers may vary widely. Examples include, but are not limited to, ethylene-based polymers having a melt index (I2, measured by ASTM method D-1238 (conditions of 190° C. and 2.16 kg)) from about 0.1 to about 1000 gm/10 minutes, preferably from about 0.3 to about 200 gm/10 minutes, and more preferably from about 0.5 to about 10 gm/10 minutes. Further examples include, but are not limited to, propylene-based polymers having a melt index (I2, measured by ASTM method D-1238 (conditions of 230° C. and 2.16 kg)) from about 0.1 to about 1000 gm/10 minutes, preferably from about 0.3 to about 200 gm/10 minutes, and more preferably from about 0.5 to about 10 gm/10 minutes.

The above polymers are typically produced in a solution or slurry polymerization reactor in which the monomers and produced polymers are entrained in a solvent. Other polymer solutions also may be made (intentionally or unintentionally) containing large or small amounts of volatile components. Typical volatile components include solvents (such as aromatic or aliphatic inert diluents), as well as unreacted monomers and/or comonomers. The amount of solvent, unreacted monomers, unreacted comonomers, and/or other volatile components to be removed from the polymer solution may range from a large excess to a mere contaminating amount. Molten polymers produced in solution- or slurry-polymerization plants, even after an initial flash-devolatilization stage, often contain from 10 to 25 weight percent or more of dissolved or entrained volatile components at the point they are processed in a plate heater devolatilization apparatus. Typically, the amount of residual volatile components remaining in the devolatilized polymer should be less than about 2000 wppm, preferably less than 1500 wppm, and more preferably less than 1000 wppm, as measured by ASTM D-4526.

Depending upon the starting concentration of volatile components in the flowable material to be devolatilized, and the level of residual volatiles that are acceptable in the devolatilized product, more than one stage (such as two or three stages) of devolatilization apparatus may be used. In addition, the devolatilization apparatus may be used in combination with other known devolatilization techniques, such as simple flash-devolatilization, ionic fluid extraction, extraction using a super-critical fluid, distillation, steam-stripping or carbon-dioxide-stripping, either in separate devolatilization stages or (in the case, for example, of steam-stripping or carbon-dioxide stripping) in combination with the apparatus of this invention within the same devolatilization stage.

Description of the Apparatus

The devolatilization apparatus of the invention includes an improved heat exchanger which allows higher flow rates of flowable materials while achieving both high rates of heat exchange and substantially complete vaporization of the volatile components, thereby increasing the throughput and efficiency of the heat exchanger. The plates may be made of any suitable material but preferably are made of steel, stainless steel, aluminum, or other metallic material.

Figure 1:
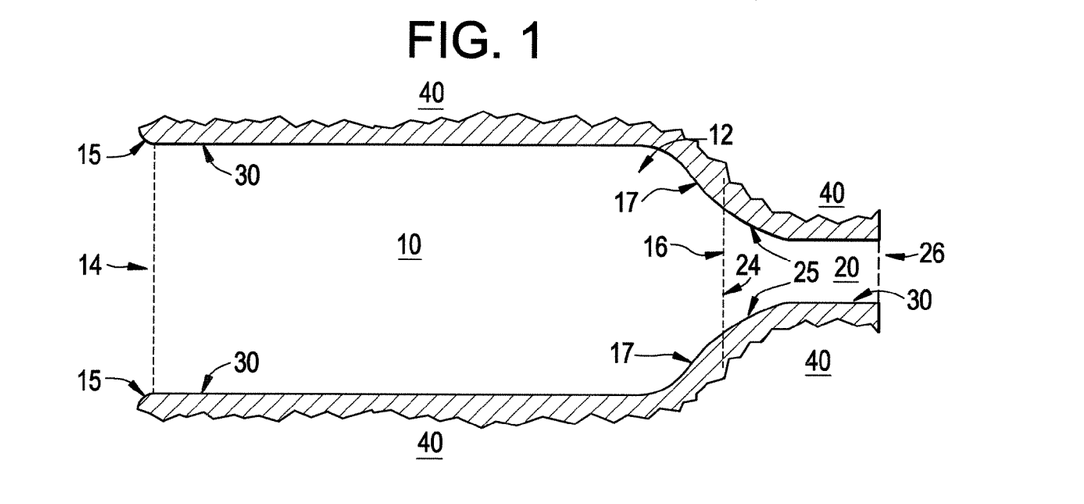
FIG. 1 depicts a single heating channel useful in one embodiment of the apparatus of the invention.

FIG. 1 depicts the shape of a single heating channel (12) in accordance with one embodiment of the apparatus of this invention. The heating channel (12) is the space defined by the walls (30) of the surrounding plate (of which only the immediately adjacent part of one plate is shown as 40) and adjacent blocks or other plates (not shown) which define the floor and ceiling of the channel (12). The heating channel itself comprises two zones, a first zone (10) which has a relatively large cross-sectional area from its inlet (14) to its outlet (16), and a second zone (20) which has a substantially smaller cross-sectional area in at least one location between the first zone's outlet (16), which is also the inlet (24) to the second zone, and the second zone's outlet (26). The cross-sectional area of the second zone is sized (in view of the operating conditions and properties of the flowable material to be devolatilized) so as to prevent any significant flashing of the volatile components from the flowable material in the first zone (10), so as to keep the flowable material within the first zone (10) pressurized above its bubble point pressure and thereby enhancing the heat transfer efficiency from the surrounding walls (30) of the plates forming the channel into the polymer solution within the first zone (10). Also, the cross-sectional area of the restricted portion (or all) of the second zone (20) is sized to cause substantial flashing, preferably substantially complete flashing, of the volatile components from the flowable material either within the second zone (20) itself, or more preferably immediately downstream thereof upon exiting from the outlet (26) of the second zone (20).

The plates which define the first zone of the heating channel preferably have sufficient surface area in contact with the flowable material to raise its temperature to the ultimate devolatilization temperature. Because pressure on the flowable material in the first zone is maintained above the bubble point pressure, flashing is eliminated from the first zone.

Typically, the apparatus of the invention will be designed and operated such that the pressure on the flowable material at essentially all locations within the first zone is at least 2 percent, preferably at least 5 percent, more preferably at least 10 percent, and most preferably at least 15 percent above the bubble point pressure of the flowable material at the highest temperature within the first zone of the heating channel.

Figure 2:
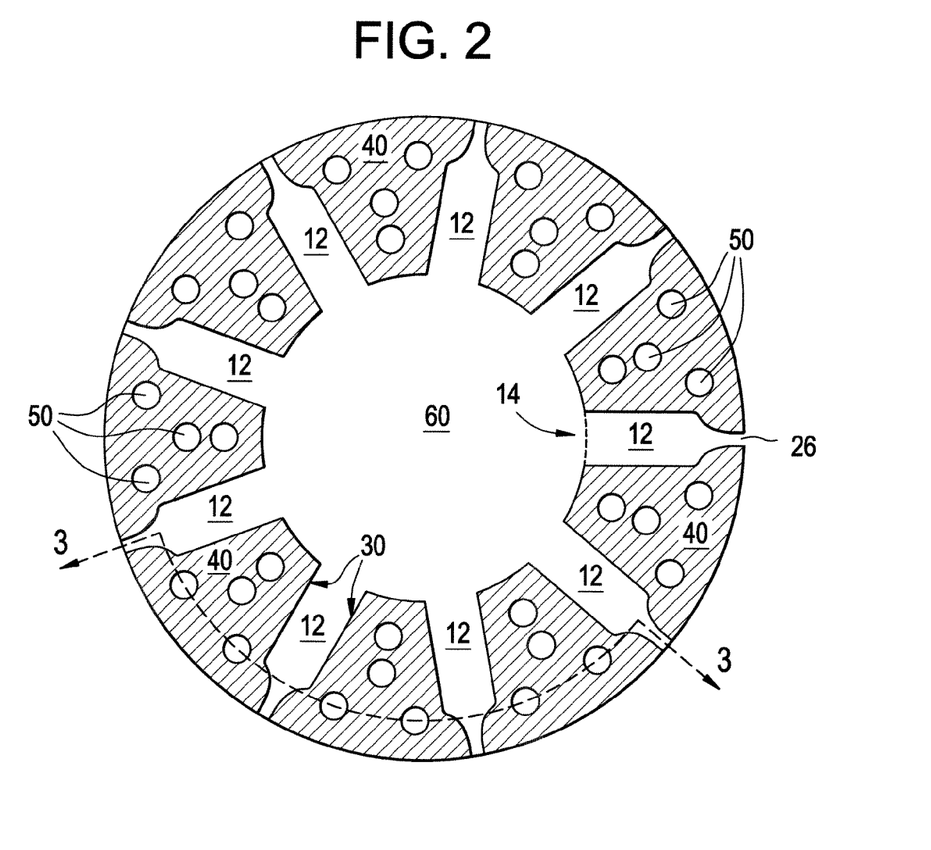
FIG. 2 is a simplified, axial view of the top of a flat plate useful in the apparatus of the invention that incorporates the heating channel design of FIG. 1.
Figure 3:
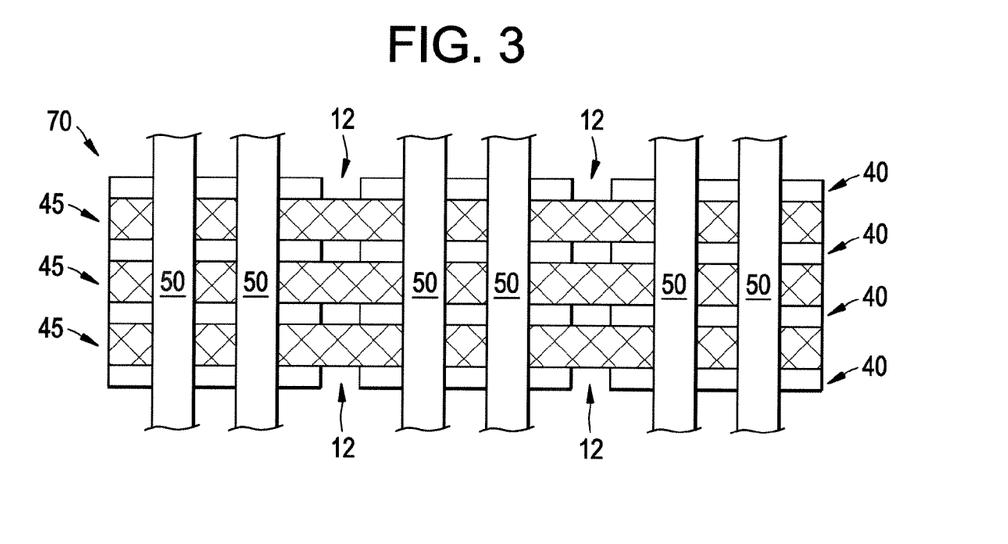
FIG. 3 is a side, partial cross-sectional view showing a portion of the circumference of a stack of flat plates taken along the section shown as 3-3 in FIG. 2.
Figure 4:
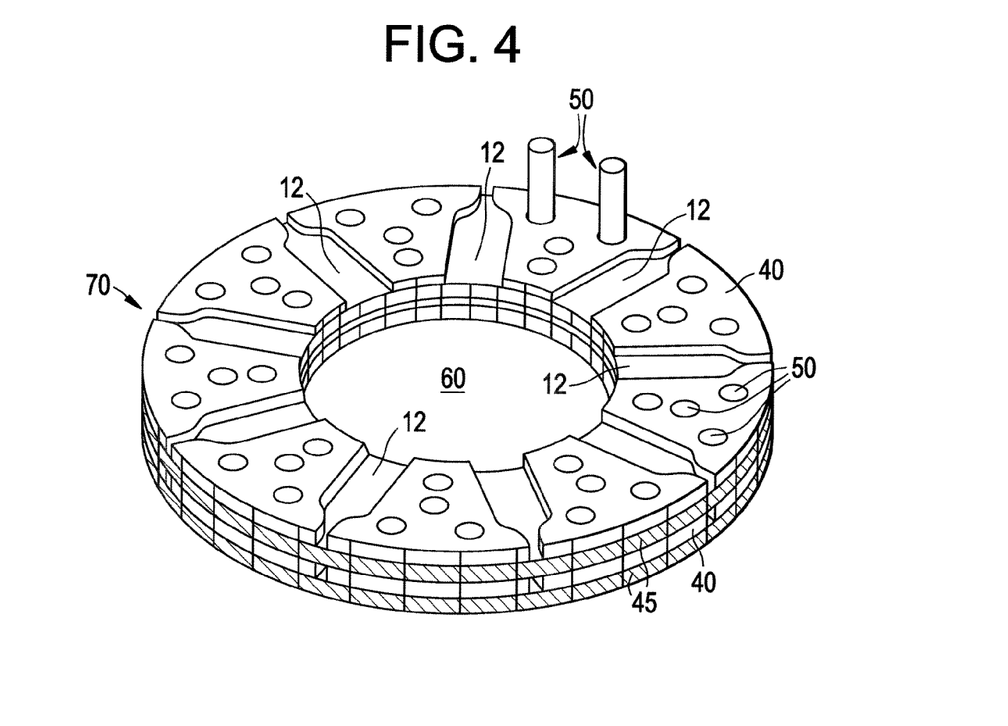
FIG. 4 is a partial isometric view of one embodiment of the apparatus of this invention including a stack of flat plates that incorporate the heating channel design of FIG. 2.

The height of each heating channel will typically be substantially uniform throughout its length—as desired for ease of manufacture and assembly of stacks of the heating plates (as shown in FIGS. 3 and 4). The height is selected along with the other dimensions of the heating channel and the heating elements (as shown in FIGS. 2, 3, and 4) adjacent to the heating channel to optimize the efficient transfer of heat from those heating elements into the flowable material within the heating channel. Typically heating channels will have a substantially uniform height over the entire length thereof of from about 0.05 cm to about 5 cm (0.02 to 2 inches), preferably from about 0.07 to about 2.5 cm (0.03 to 1 inch), more preferably from about 0.12 to about 1.3 cm (0.05 to 0.5 inch).

The shape and cross-sectional area of the first zone (10) of the heating channel (12) may vary widely, provided that, under the conditions of operation or the design conditions, the flowable material passing through the first zone is maintained above its bubble point pressure at essentially all locations within the first zone. Thus, as shown in FIG. 1, the shape and cross-sectional area (and the hydraulic radius) of the first zone (10) may be substantially uniform between its inlet (14) and its outlet (16), except for relatively short transition sections—such as the transition sections shown as (15) at the inlet (14) and as (17) at the outlet (16). Alternatively, the shape and cross-sectional area of the first zone of the heating channel may be diverging, or converging, or some combination of a plurality of sections each of which might be diverging, converging, or substantially uniform. Regardless of its configuration, the average hydraulic radius of the first zone should be larger than the hydraulic radius of at least a portion of the second zone.

Figure 5:
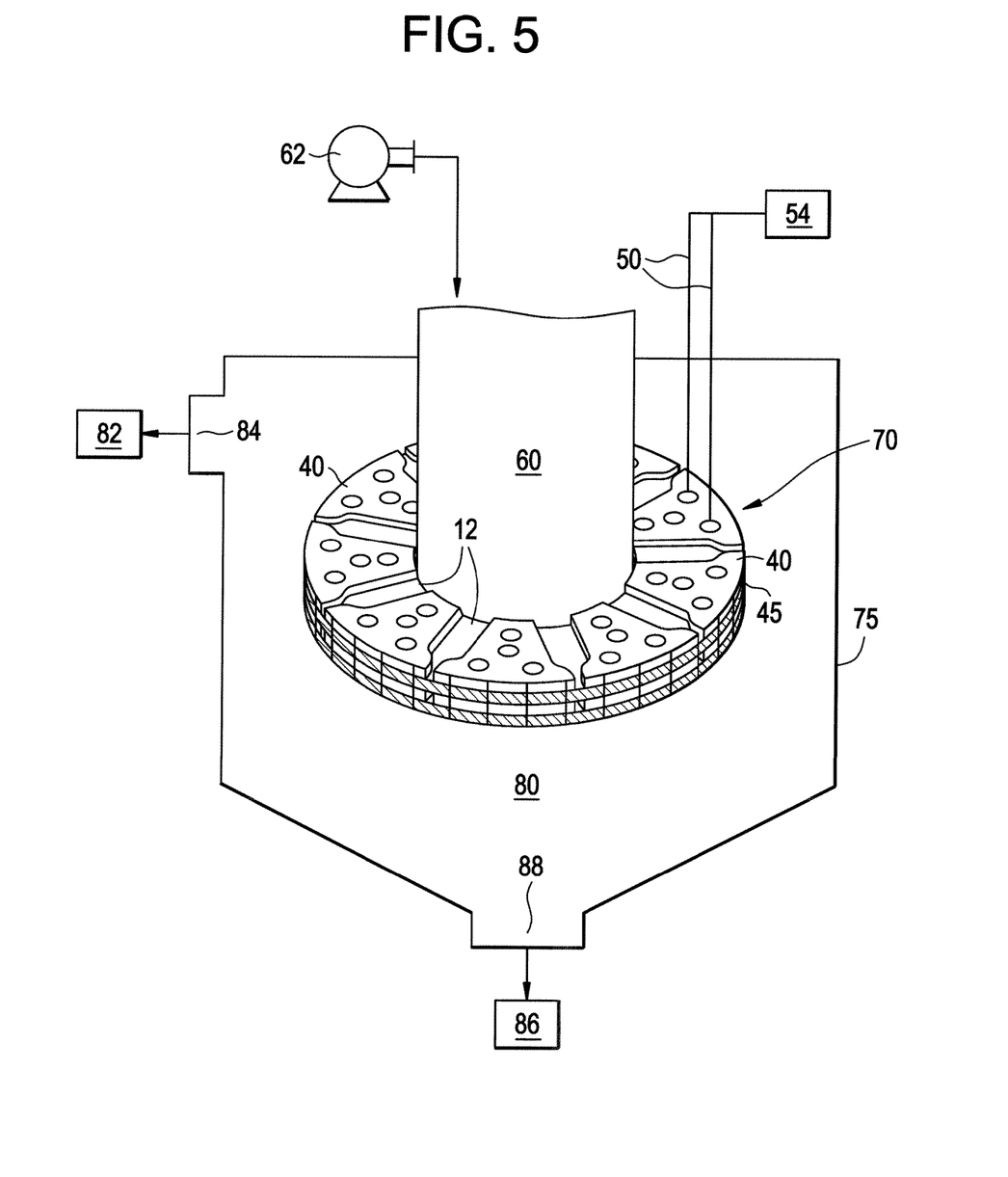
FIG. 5 is a schematic diagram showing various elements of one embodiment of the apparatus of this invention.

The second zone (20) begins at the outlet (16) of the first zone (10) and terminates in an outlet (26) that is adapted to discharge the flowable material into a collection-and-separation vessel (not shown in FIG. 1, but shown in FIG. 5 as vessel (75)). The second zone (20) varies in length, which is typically from 0.2 percent to 40 percent, preferably from about 0.5 to about 10 percent, and more preferably from about 1 to about 5 percent, of the total length of the heating channel (12). The cross-sectional area of the second zone (20) is smaller than the cross-sectional area of the first zone (10), both to impose a sufficient back pressure on the flowable material within the first zone (10), and to result in a rapid and dramatic flashing of the volatile components out of the flowable material either within the second zone (20), or preferably immediately downstream of the outlet (26) of the second zone (20). At its narrowest point the second zone (20) typically has a cross-sectional area from about 0.01 to about 2 square centimeters, preferably from about 0.02 to about 1 square centimeter, and more preferably from about 0.1 to about 0.5 square centimeters. The ratio of the average cross-sectional area of the first zone to the cross-sectional area of the narrowest part of the second zone is typically from about 2:1 to about 200:1, and preferably is from about 5:1 to about 60:1, and more preferably is from about 10:1 to about 30:1.

The shape and cross-sectional area (and hydraulic radius) of the second zone of the heating channel may vary, provided that the second zone is sized such that, under the conditions of operation or the design conditions, (a) the flowable material passing through the first zone is maintained at a pressure above its bubble point pressure, and (b) the pressure drop induced in the second zone will result in sufficient flashing of the volatile components from the flowable material. Thus, as shown in FIG. 1, the cross-sectional area and shape of the second zone (20) may be substantially uniform between its inlet (24) and its outlet (26), except for a short transition section (25) at the inlet (24). Alternatively, the shape and cross-sectional area of the second zone may be converging or diverging or some combination thereof to induce the necessary pressure drop and flash the volatile components within the second zone (20), or preferably at the outlet (26).

The overall length of the heating channel (12) is typically from 5 to 61 cm (from 2 to 24 inches), preferably from 15 to 31 cm (from 6 to 12 inches), and more preferably from 20 to 26 cm (from 8 to 10 inches). The length of the first zone (10) is typically from 2.5 to 51 cm (from 1 to 20 inches), preferably from 12 to 31 cm (from 5 to 12 inches), and more preferably from 17 to 25 cm (from 7 to 9.5 inches). In order to increase the efficiency of the heat transfer from the surrounding plates into the flowable material, the first zone should constitute the majority of the heating channel. Accordingly, the ratio of the length of the first zone to the total length of the heating channel is typically from 0.5:1 to 0.998:1, preferably from 0.7:1 to 0.995:1, and more preferably from 0.90:1 to 0.99:1.

For an embodiment of the apparatus designed for devolatilization of solvent, and unreacted monomers or comonomers from a flowable material that contains these volatile components entrained or dissolved in a viscous molten polymer, the average hydraulic radius of the first zone (10) may be from about 0.06 to about 1.2 centimeters (0.024 to 0.47 inches), and the hydraulic radius of the most-restricted portion (or all) of the second zone (20) may be from about 0.03 to about 1.1 centimeters (0.012 to 0.43 inches). The height of the heating channel typically may be from about 0.15 to about 2.5 cm (0.06 to 1 inches), preferably from about 0.19 to about 1 cm (0.07 to 0.4 inches), and more preferably from about 0.25 to about 0.64 cm (0.1 to 0.25 inches). The length of the heating channel may be from about 5 to about 61 cm (2 to 24 inches); and the length of the first zone of the heating channel may be from about 2.5 to about 51 cm (1 to 20 inches), preferably from about 12 to about 28 cm (5 to 11 inches), more preferably from about 17 to about 23 cm (7 to 9 inches). The second zone constitutes the remainder of the heating channel. Consequently, the length of the second zone of the heating channel typically may be from about 0.2 to about 16 cm (0.1 to 6 inches), preferably from about 0.5 to about 7.6 cm (0.2 to 3 inches), and more preferably from about 0.7 to about 2.6 cm (0.3 to 1 inches).

The width of the heating channel is different in the first and second zones. The width of the first zone may be from about 1.3 to about 30 cm (0.5 to 12 inches), preferably from about 2.5 to about 20 cm (1 to 8 inches), and more preferably from about 3.8 to about 10 cm (1.5 to 4 inches). The width of the second zone may be from about 0.12 to about 15 cm (0.05 to 6 inches), preferably from about 0.2 to about 2.5 cm (0.075 to 1 inch), and more preferably from about 0.25 to about 0.65 cm (0.1 to 0.25 inch).

In some embodiments of this invention, the ratio of (a) the average hydraulic radius of the first zone to (b) the hydraulic radius of the portion of the second zone having the smallest cross-sectional area is from about 1.05:1 to about 10:1, preferably from about 1.15:1 to about 8:1, and more preferably from about 1.3:1 to about 6:1.

In one preferred embodiment, the length of the heating channel is from about 20 to about 26 cm (8 to 10 inches), the height of the heating channel is from about 0.12 to about 0.38 cm (0.05 to 0.15 inches), the length of the first zone is from about 17 to about 24 cm (7 to 9.5 inches), and the width of the first zone is substantially uniform from about 3.8 to about 10 cm (1.5 and 4 inches), the hydraulic radius of the first zone is substantially uniform at from about 0.061 to about 0.184 cm (0.024 to 0.072 inches), and the length of the second zone is from about 0.63 to about 1.91 cm (0.25 to 0.75 inches), and the width of the second zone is substantially uniform from about 0.25 to about 0.64 cm (0.1 and 0.25 inches) and the second zone has a single outlet, and a hydraulic radius from about 0.04 to about 0.12 cm (0.016 to 0.047 inches); and the ratio of (a) the average hydraulic radius of the first zone to (b) the hydraulic radius of the portion of the second zone having the smallest cross-sectional area is from about 1.05:1 to about 5:1.

The heating channels of the invention will typically be designed or operated such that the pressure of the flowable material is decreased as it flows through the first zone of the heating channel. For a given heating channel design, the pressure drop across the first zone will vary with the throughput and the viscosity of the flowable material, with more viscous materials experiencing higher pressure drops than less viscous materials. For devolatilization of a molten polymer, this pressure drop across the first zone may typically be from about 50 to about 2000 psi, preferably from about 100 to about 1800 psi, and more preferably from about 300 to about 1500 psig. However, the pressure at each position within the first zone should remain above the bubble point pressure at that position in order to avoid flashing of the volatile components. Typically, the pressure at essentially all positions within the first zone will be at least 5 percent (preferably at least 10 percent, and more preferably at least 15 percent) above its bubble point pressure at the highest temperature of the flowable material within the first zone.

FIG. 2 depicts a simplified, axial view of the top of a plate useful in one embodiment of the apparatus of this invention that incorporates the heating channel design of FIG. 1. The plate (40) has a plurality of heating channels (12) which provide fluid communication between an axially aligned chamber (60) for receiving the supply of a flowable material to be devolatilized from a pump (not shown in FIG. 2, but shown in FIG. 5 as pump (62)), and a collection-and-separation vessel (not shown in FIG. 2, but shown in FIG. 5 as vessel (75)) exterior to and surrounding the plate (40). Plate (40) has a plurality of heating elements (50) disposed within the plate (40) and spaced around and between heating channels (12), and adapted to transfer heat from the heating elements (50) through the walls (30) of the plate (40) and into the heating channels (12). The heating elements (50) may be any type of heating element, such as electrical heating elements or thermal-fluid heating elements. Preferably, heating elements (50) comprise a multiplicity of heat exchange tubes through which a thermal-fluid (such as steam, hot oil, a synthetic liquid, or other heated liquid) is flowed. The type of heated fluid to be used will depend upon the temperature and pressure requirements of the system, as is well know in the design of heat exchangers.

FIG. 3 depicts a side, partial cross-sectional view showing a portion of the circumference of a stack (70) of plates (40) in one embodiment of the apparatus of this invention taken along the section shown as 3-3 in FIG. 2. The stack comprises a multiplicity of plates (40) in the shape of disks stacked in alternating layers with blocks (45) of an appropriate shape and arranged so as to define the walls, floor and ceiling of each channel (12) and secured so as to define a central chamber (not shown in FIG. 3, but shown as 60 in FIGS. 2, 4 and 5) for receiving the flowable material to be devolatilized from the supply means. Heating elements (50) pass through, and are adapted to transfer heat into, plates (40) and blocks (45) which in turn transfer such heat through the walls, floors and ceilings of the heating channels (12) into the flowable material. The heating elements (50) may be conduits or pipes through which a thermal-fluid passes. The plates (40) and blocks (45) may be secured together by the heating elements, or other securing means, such as bolts (not shown). The number of plates (40) and blocks (45) in the stack (70) may vary from as few as two to as many as several thousand plates, preferably from about 10 to about 1000 plates, and more preferably from about 100 to about 800 plates. The number of heating channels (12) formed by each of the plates (40) and the adjacent blocks (45) in the stack (70) may vary from as few as one to several hundred heating channels, preferably from about 2 to about 100 heating channels, and more preferably from about 20 to about 70 heating channels per plate. The total number of heating channels (12) in a given stack (70) may vary widely, from as few as 2 to 100,000 or more, preferably from about 2,000 to about 60,000, more preferably from about 10,000 to about 50,000.

FIG. 4 is a partial isometric view of one embodiment of the plate heater of this invention which includes a stack (70) of alternating plates (40) and blocks (45), which together define heating channels (12) for the flowable material to pass through from the central chamber (60) to the exterior of the stack. Heating elements (50), only a few of which are shown in FIG. 4, extend through the plates (40) and blocks (45) of the stack (70).

FIG. 5 is a partially schematic diagram showing in part an oblique cut-away view of one embodiment of the apparatus of this invention comprising the plate heater stack (70) as previously described. The heater is mounted within and sealably attached to a shell or vessel (75). The interior of the shell (75) and the exterior of the plate heater (70) define a collection-and-volatile-separation chamber (80) which, at the conditions of operation and/or at the design conditions, would be held at, or evacuated to, a reduced pressure (typically a vacuum of 1 psia or less) at which the volatile components of the flowable material are vapors at the temperature at which the flowable material enters the chamber (80) after passing through heating channels (12). The chamber (80) is in operative communication with a vapor-evacuation system (82), such as a vacuum pump (not shown), to remove volatile components through a vapor exit (84) of vessel (75). The vapor-evacuation system (82) will typically include a condenser (not shown) to cool and condense the vapors and other equipment (not shown), as is well known, to separate and then either recycle or otherwise dispose of the volatile components. The chamber (80) is also in operative communication with a discharge means (86), such as a gear pump (not shown), connected to an outlet (88) of vessel (75) and adapted to discharge the devolatilized liquid or flowable solid from chamber (80). A plurality of heating elements (50), only two of which are shown in FIG. 5, extend through the plates (40) and blocks (45) transfer heat from a heating source (54), such as a fired heater or boiler (not shown), through the plates and blocks into the flowable material in the heating channels (12).

Figure 7:
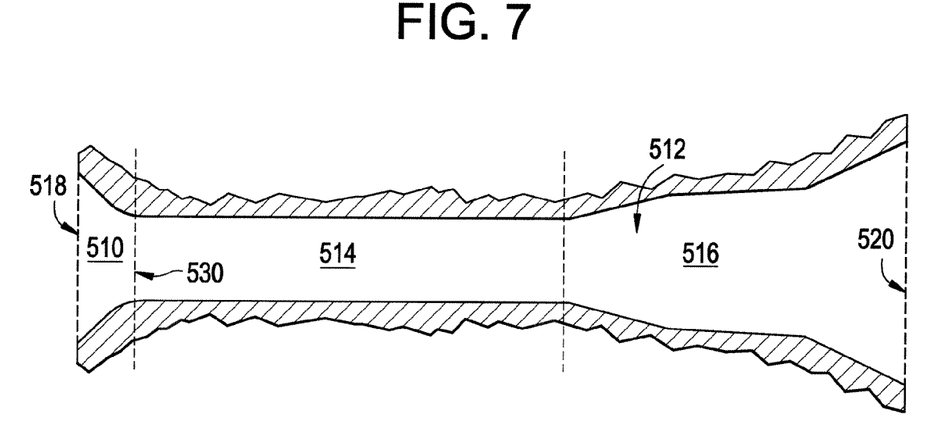
FIG. 7 depicts a single heating channel of a flat plate heater of the type disclosed in U.S. Pat. No. 5,453,158, which conventional heating channel design is used for comparison with the heating channel design of FIGS. 1, 2, and 4.

By way of comparison, FIG. 7 depicts a single heating channel (512) of a flat plate heater of the type disclosed in U.S. Pat. No. 5,453,158, which conventional heating channel design is considered by applicants to be the most effective technology prior to their present invention. Heating channel (512) has three zones: a first generally converging zone (510) which is wider at its entrance (518) than its exit (530); a second, restrictive zone (514) wherein the channel achieves a minimum width sufficient to cause a pressure drop across the restrictive zone (514), thereby preventing substantial flashing of the volatile components while in the first zone while allowing flashing in the second, restrictive zone; and a third generally diverging zone (516) terminating in outlet (520). This heating channel design allows flashing of the volatile components beginning in the second zone and continuing in the third zone. U.S. Pat. No. 5,453,158 teaches that the length of the first zone 510) is from 5 to 20 percent of the total length of the channel (512), the length of the second zone (514) is from 1 to 40 percent of the total length of the channel (512), and the length of the third zone (516) is from 40 to 85 percent of the total length of the channel (512). Flat plate heaters using that heating channel design (such as a uniform 0.10 inch height, a total length of 9.0 inches, a first converging zone having 2.8 inch wide inlet and a length of 0.6 inches, a second restrictive zone having a 4.8 inch length, and a 1.9 inch width, and a third diverging zone having a 3.6 inch length and an exit width of 4.2 inches) have been used in the devolatilization of molten polymers at rates up to about 1.23 kg per hour per channel (2.7 pounds per hour per channel), but are not capable of effective devolatilization at any higher throughput per channel. This restriction necessitates very large stacks of flat plates (in some cases requiring 724 plates with 60 heating slots per plate, and a total stack height of 145 inches) which either imposes practical limits on the maximum size of the devolatilization train (such as to about 330 thousand metric tons per annum) where a single flat plate heater/devolatilizer apparatus is used, or requires the use of redundant flat plate heater/devolatilizer trains with the attendant higher capital costs. As shown in the Examples and Comparative Examples below, the heating channel design of this invention is not so limited.

Figure 6A:
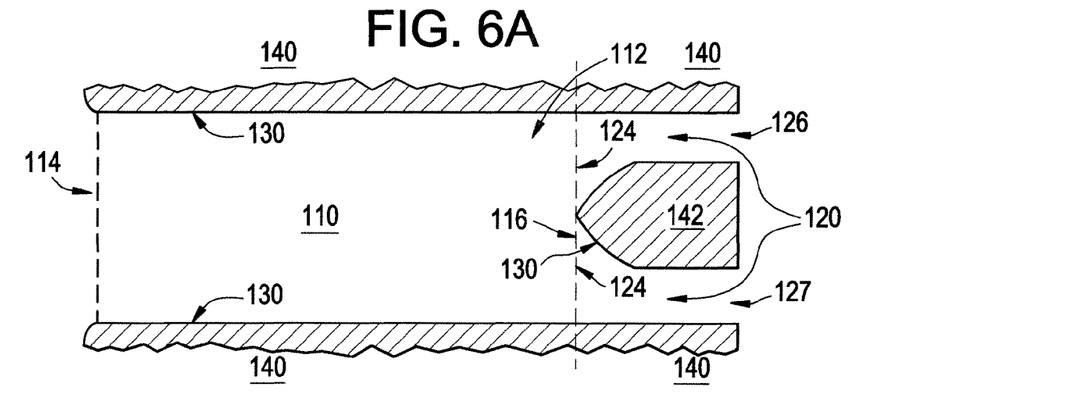
FIGS. 6A, 6B, and 6C depict three alternative embodiments of the heating channels useful in the apparatus of this invention.
Figure 6B:
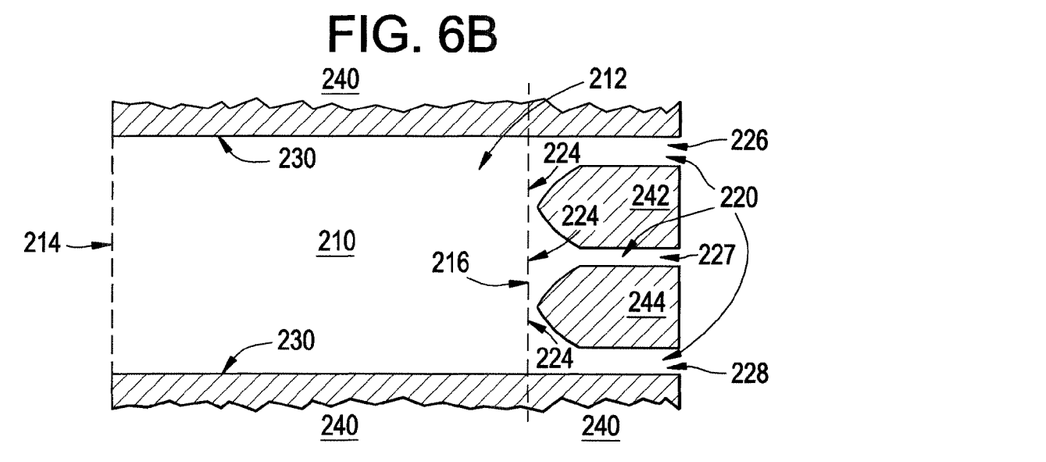
Figure 6C:
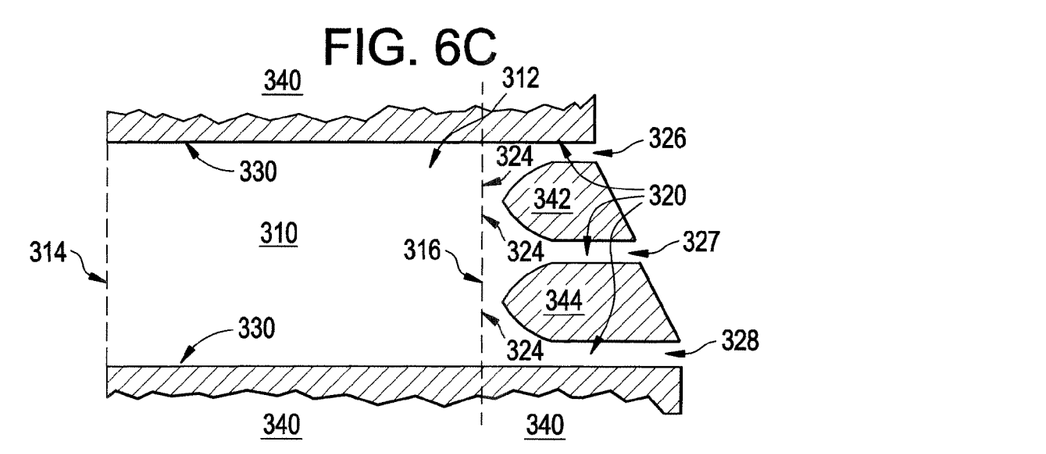

FIGS. 6A, 6B, and 6C illustrate three alternative embodiments of the heating channels useful in the apparatus of this invention, wherein the second zone of at least some of the heating channels has a plurality of outlets, rather than the single outlet (26) shown in FIG. 1.

FIG. 6A depicts the shape of a single heating channel (112) of this invention, which is the space defined by the walls (130) of the surrounding plate (of which only the immediately adjacent part of one plate is shown as (140) and (142)) and adjacent blocks or other plates (not shown) which define the floor and ceiling of the channel (112). The heating channel (112) itself consists of two zones, a first zone (110) which has a relatively large cross-sectional area from its inlet (114) to its outlet (116), and a second zone (120) having a substantially smaller cross-sectional area and comprising inlet (124) and two outlets (126) and (127), FIG. 6B depicts the shape of a single heating channel (212) of this invention, which is the space defined by the walls (230) of the surrounding plate (of which only the immediately adjacent part of one plate is shown as (240), (242) and (244)), and adjacent blocks or other plates (not shown) which define the floor and ceiling of the channel (212). The heating channel (212) itself consists of two zones, a first zone (210) which has a relatively large cross-sectional area from its inlet (214) to its outlet (216), and a second zone (220) having a substantially smaller cross-sectional area and comprising inlet (224) and three outlets (226), (227) and (228), FIG. 6C depicts the shape of a single heating channel (312) of this invention, which is the space defined by the walls (330) of the surrounding plate (of which only the immediately adjacent part of one plate is shown as (340), (342) and (344)), and adjacent blocks or other plates (not shown) which define the floor and ceiling of the channel (312). The heating channel itself consists of two zones, a first zone (310) which has a relatively large cross-sectional area from its inlet (314) to its outlet (316), and a second zone (320) having a substantially smaller cross-sectional area and comprising inlet (324) and three staggered outlets (326), (327) and (328), In this embodiment with staggered outlets (326), (327), and (328), the individual streams of liquid or flowable solid effluent from the heating channel (such as strings of molten polymer in one embodiment) are spaced apart radially sufficiently so that, under the conditions of operation or the design conditions, the effluent streams do not physically contact each other until after substantially complete devolatilization has occurred. It is envisioned that such staggering of the outlets may help to avoid the commingling of effluent liquid or flowable solids from adjacent outlets, which commingling might trap volatile components between such effluent streams that would otherwise escape. Other approaches to avoid such immediate contacting of the effluent from the plate heater of this invention (not shown) include using a stack of plates of various shapes or sizes, such as in an inverted pyramid structure (not shown), where the heating channel outlets of the upper plates are spaced further radially from the axis of the plate heater than the plates lower in the plate heater. In such an embodiment the effluent streams would descend into the collection vessel much like the streams of water from a shower head.

Description of the Process

Referring to FIG. 5, in the operation of one embodiment of the process of this invention, a thermal-fluid, at the appropriate temperature, is pumped from a source (54) through heating elements (50), heating the stacked plates (40) and blocks (45). Polymer solution from the pump (62) fills the central chamber (60), enters the heating channels (12), and flows outwardly through the heating channels (12) to exit into chamber (80). As a result of the high temperature of the flowable material leaving the heating channels (12), and the reduction in pressure to below the bubble point pressure, the volatile components are flashed, which flashing takes place within, or preferable immediately downstream of, the second zone (20) of the heating channels (12). The flashed vapors are removed through vapor exit (84) by vapor-evacuation system (82). The devolatilized liquid or flowable solid is collected in the bottom of chamber (80) by gravity flow and discharged through exit (88) by a collection system (86), which may be, for example, a valve, a gear pump, or an extruder (not shown). In some embodiments for the removal of solvents and unreacted monomers and comonomers from molten polymers, where the concentration of volatile components in the molten polymer is very high, adequate devolatilization may require the use of more than one apparatus of this invention operating in series to reduce the content of volatile components in the molten polymer in two or more steps.

While the illustrated embodiment indicates that each channel (12) has a rectangular cross section it is understood that the edges of the inlets and outlets could also be rounded. For example, in order to avoid sharp corners in the inlets, outlets, and/or interior of the channels the edges of the plates or blocks forming the channels could be machined to have curved (rather than sharp) transitions.

The vaporization or thermal-decomposition temperature for any particular liquid or flowable solid is either already well known or can be easily determined by those skilled in the art. The temperature of the flowable material within the heating channels should not be raised to or above that temperature. When the devolatilization apparatus of this invention is used to remove volatile components (such as solvents, unreacted monomers and/or comonomers) from molten polymers, it is typically not necessary to heat vinylaromatic polymers above about 350° C. or to heat olefin-based polymers above about 290° C.

EXAMPLES

The following examples are provided to illustrate the surprising performance achievable with the apparatus and process of this invention. The examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention. Those skilled in the art are able to model the temperatures and pressures of any flowable material within the heating channels of the present invention, using known finite element modeling techniques. Suitable modeling techniques for the flowable materials comprising molten polymers, solvents, and unreacted monomers of the Examples and Comparative Examples are described by C. G. Dumas and R. S. Dixit in their paper "Finite Element Modeling of Polymer Flow and Heat Transfer in Processing Equipment," which was presented at the *International Symposium on Computer Applications in Applied Polymer Science, II. Automation, Modeling and Simulation*, Toronto, Canada, and published in ACS Symposium Series, No. 44, 521-536, 1989. The disclosure of that paper is incorporated herein by reference.

Example 1 and Comparative Example A

In Example 1 and in Comparative Example A, a flowable material comprising 85 weight percent of molten ethylene-octene copolymer (having a melt index (I2) of 0.5 gm/10 minutes) and 15 weight percent of volatile materials (a combination of an alkane solvent, unreacted ethylene and unreacted octene comonomer) is processed in two separate devolatilization systems.

For Example 1, one embodiment of the devolatilization apparatus of this invention is used. The plate heater stack has twenty-seven combination plate-and-block elements (in which the heating channels were machined out of the combined elements) and one end-block element, and each such combination element has 2 heating channels. The flowable material at a temperature of 185° C. (at which temperature the flowable material has a bubble point pressure of 3.9 bar gauge [57 psig]) is pumped into a flat plate heater having 54 heating channels with the configuration illustrated in FIG. 1. The dimensions of the heating channels are: a uniform height of 0.25 cm (0.1 inch), a total length of 22.9 cm (9 inches), a length of the first zone of 21.6 cm (8.5 inches), a substantially uniform width of the first zone of about 5 cm (2 inches) for all except the last 1.9 cm (0.75 inches) which is machined for a smooth convergence to the inlet of the second zone, a length of the second zone of 1.3 cm (0.5 inches), and a substantially uniform width of the second zone of 0.38 cm (0.15 inches). The hydraulic radius of all except the last 1.9 cm (0.75 inches) of first zone is about 0.121 cm (0.0476 inches), and the hydraulic radius of the second zone is about 0.076 cm (0.03 inches), for a ratio of 1.59:1. The flowable material has a pressure of 88 bar gauge (1276 psig) at the inlet to the first zone, and a calculated pressure of 26 bar gauge (380 psig) at the inlet to the second zone—which pressures are both above the bubble point pressure of the flowable material at those locations. The flow rate through each channel is maintained at about 3.54 kg/hour (7.8 pounds per hour). Within the heating channel, the flowable material is heated by indirect heat exchange (from the heating elements embedded in the plates) to a peak temperature within the first zone of the heating channel of about 265° C. (at which temperature the flowable material has a bubble point pressure of 16.8 bar gauge [243 psig], which is less than the pressure of 26 bar gauge [380 psig] at the inlet to the second zone). The collection and vapor-separation vessel is maintained at a reduced pressure of about 20 millibar (0.29 psia). The pressure drop from the inlet to the flat plate heater to the collection and vapor-separation vessel is about 88 bar (1276 psi). The volatile materials flash from the flowable material and are separated and recovered, and the devolatilized polymer product is recovered. A throughput of at least 3.54 kg/hr per heating channel (7.8 pounds per hour per heating channel) can be achieved in Example 1 while producing a polymer product having less than 2000 wppm of residual volatile components, as measured by ASTM D-4526.

For purposes of comparison with Example 1, Comparative Example A employs the same flowable material and a devolatilization apparatus that is substantially similar to Example 1, with the exception that flat plate heater has heating channels with the three-zone configuration of U.S. Pat. No. 5,453,158 as illustrated in FIG. 7. The plate heater stack has one hundred combination plate-and-block elements (in which the heating channels were machined out of the combined elements) and one end-block element, and each such combination element has 2 heating channels. The dimensions of the heating channels are: a uniform height of 0.25 cm (0.1 inch), a total length of 22.9 cm (9 inches), a length of the first converging zone of 1.6 cm (0.63 inches), a length of the second restricted zone of 11.6 cm (4.6 inches), and a length of the third diverging zone of 9.7 cm (3.8 inches). The width of the inlet to the first converging zone is about 7 cm (2.8 inches); the width of the second restricted zone is essentially uniform at 5.3 cm (2.1 inches); and the width of the third diverging zone increases from 5.3 cm (2.1 inches) at its inlet in two steps out to 10.8 cm (4.2 inches) at its exit. The hydraulic radius of the first zone converges from about 0.123 cm (0.048 inches) at its inlet to about 0.121 cm (0.047 inches) at its outlet. The hydraulic radius of the second restrictive zone is substantially uniform at about 0.121 cm (0.047 inches) throughout its length. The hydraulic radius of the third zone diverges from about 0.121 cm (0.047 inches) at its inlet to about 0.124 cm (0.049 inches) at its outlet. As taught in U.S. Pat. No. 5,453,158, the flowable material is to be maintained at a substantially constant pressure (in this case about 48 bar gauge (697 psig) at the 200° C. peak temperature achievable by the exit of the first zone) in the first zone to avoid flashing in the first zone (i.e., the first 1.6 cm (0.625 inches) of the heating channel); however, within the second, restrictive zone the flowable material begins flashing, which flashing continues through the third zone and into the chamber of collection and vapor-separation vessel which is maintained at a reduced pressure of about 20 millibar (0.29 psia). Within the constraints of this trumpet-like, heating-channel design, the pressure of the flowable material at the inlet to the heating channel is about 48 bar gauge (697 psig), and the pressure drop between that inlet and the collection vessel is about 48 bar (697 psi). 1.2 kg/hr per heating channel (2.7 pounds per hour per heating channel) is the highest flow rate achieved in this heating channel while producing a polymer product having less than 2000 wppm of residual volatile components, as measured by ASTM D-4526.

Example 2 and Comparative Example B

In Example 2 and in Comparative Example B, a flowable material comprising 87 weight percent of molten ethylene-octene copolymer (having a melt index (I2) of 1.0 gm/10 minutes) and 13 weight percent of volatile materials (a combination of an alkane solvent and unreacted ethylene and octene monomers) is processed in two separate devolatilization systems.

For Example 2, one embodiment of the devolatilization apparatus of this invention is used. The plate heater stack has 282 plates and 283 blocks, and each plate has 40 heating channels. The flowable material at a temperature of 208° C. (at which temperature the flowable material has a bubble point pressure of 6 bar gauge [88 psig]) is pumped into a flat plate heater having 11,280 heating channels with the configuration illustrated in FIG. 1. The dimensions of the heating channels are: a uniform height of 0.25 cm (0.1 inch), a total length of 22.9 cm (9 inches), a length of the first zone of 21.6 cm (8.5 inches), a substantially uniform width of the first zone of 5.1 cm (2 inches) for all except the last 1.9 cm (0.75 inches) which is machined for a smooth convergence to the inlet of the second zone, a length of the second zone of 1.3 cm (0.5 inches), and a substantially uniform width of the second zone of 0.38 cm (0.15 inches). The hydraulic radius of all except the last 1.9 cm (0.75 inches) of first zone is about 0.121 cm (0.0476 inches), and the hydraulic radius of the second zone is about 0.076 cm (0.03 inches), for a ratio of 1.59:1. The flowable material has a pressure of 127 bar gauge (1847 psig) at the inlet to the first zone, and a calculated pressure of 33.5 bar gauge (486 psig) at the inlet to the second zone—which pressures are both above the bubble point pressure of the flowable material at those locations. The flow rate through each channel is maintained at about 5 kg/hour (11 pounds per hour). Within the heating channel, the flowable material is heated by indirect heat exchange (from the heating elements embedded in the plates) to a peak temperature within the first zone of the heating channel of about 265° C. (at which temperature the flowable material has a bubble point pressure of 16.8 bar gauge [243 psig], which is less than the pressure of 33.5 bar gauge [486 psig] at the inlet to the second zone). The pressure in the chamber of the collection and vapor-separation vessel is maintained at a reduced pressure of about 20 millibar (0.29 psia). The pressure drop from the flat plate heater inlet to the collection and vapor-separation vessel is about 127 bar (1847 psi). The volatile materials flash from the flowable material and are separated and recovered, and the devolatilized polymer product is recovered. A throughput of at least 5 kg/hr per heating channel (11 pounds per hour per heating channel) can be achieved in Example 2 while producing a polymer product having less than 2000 wppm of residual volatile components, as measured by ASTM D-4526.

For purposes of comparison with Example 2, Comparative Example B employs the same flowable material and a devolatilization apparatus that is similar to Example 2, with the exception that the heating channels of the flat plate heater have heating channels with the three-zone configuration of U.S. Pat. No. 5,453,158 as illustrated in FIG. 7. The plate heater stack has 1068 plates and 1069 blocks, and each plate has 40 heating channels. The dimensions of the heating channels are: a uniform height of about 0.25 cm (0.1 inch), a total length of 22.9 cm (9 inches), a length of the first converging zone of 1.6 cm (0.63 inches), a length of the second restricted zone of 11.6 cm (4.6 inches), and a length of the third diverging zone of 9.7 cm (3.8 inches). The width of the inlet to the first converging zone is 7 cm (2.8 inches); the width of the second restricted zone is essentially uniform at 5.3 cm (2.1 inches); and the width of the third diverging zone increases from 5.3 cm (2.1 inches) at its inlet in two steps out to 10.8 cm (4.2 inches) at its exit. The hydraulic radius of the first zone converges from about 0.123 cm (0.048 inches) at its inlet to about 0.121 cm (0.047 inches) at its outlet. The hydraulic radius of the second restrictive is substantially uniform at about 0.121 cm (0.047 inches) throughout its length. The hydraulic radius of the third zone diverges from about 0.121 cm (0.047 inches) at its inlet to about 0.124 cm (0.049 inches) at its outlet. As taught in U.S. Pat. No. 5,453,158, the flowable material is to be maintained at a substantially constant pressure (in this case about 54.8 bar gauge (795 psig) at the 208° C. peak temperature achievable by the exit of the first zone) in the first zone to avoid flashing in the first 1.6 cm (0.63 inches) of the heating channel; however, within the second zone the flowable material begins flashing, which flashing continues through the third zone and into the chamber of collection and vapor-separation vessel which is maintained at a reduced pressure of about 20 millibar (0.29 psia). Within the constraints of this trumpet-like, heating-channel design, the pressure of the flowable material at the inlet to the heating channel is about 54.8 bar gauge (795 psig), and the pressure drop between that inlet and the collection vessel is about 54.8 bar (795 psi). 1.3 kg/hr per heating channel (2.9 pounds per hour per heating channel) is the highest flow rate achieved in this heating channel while producing a polymer product having less than 2000 wppm of residual volatile components, as measured by ASTM D-4526.

These examples show that, while producing the same level of devolatilization for the flowable material, the two-zone, bottle-like heating-channel design of the apparatus of this invention (as illustrated in FIG. 1) enables a throughput per channel that is substantially higher than achievable with the three-zone, trumpet-like heating-channel design of U.S. Pat. No. 5,453,158 (as illustrated in FIG. 7). In some embodiments, the bottle-like heating channel design of this invention enables a throughput per channel that is typically 1.2 to 10 times, preferably from 1.5 to 7 times, and more preferably from 2 to 5 times, the throughput of a trumpet-like channel (as described in U.S. Pat. No. 5,453,158) of the same total channel length. This surprising result enables the design of much more efficient and less expensive devolatilization apparatus—requiring only a fraction of the number of plates as the U.S. Pat. No. 5,453,158 design. Alternatively, with the same number of plates, a flat plate heater using the heating channel configuration of this invention could process several times as much flowable material, resulting in a higher capacity for the same stack height.

Examples 3 and 4, and Comparative Example C

The following table and examples further emphasize this result:

| Variable | Units | Comparative Example C | Example 3 | Example 4 |
|---|---|---|---|---|
| Production Rate of devolatilized polymer | KTA | 370 | 446 | 925 |
| Ethylene-based Polymer | I2 | 0.5 | 0.5 | 0.5 |
| | Volatiles wt % | 10% | 10% | 10% |
| Channels | Total number | 43,440 | 13,960 | 28,960 |
| Channels | # per plate | 60 | 40 | 40 |
| Exchanger layers | Total number | 724 | 349 | 724 |
| Run time | Hours | 7884 | 7884 | 7884 |
| Stack Height | cm | 368 | 177 | 368 |
| | Inches | 145 | 69.8 | 145 |
| Throughput per heating channel | Kg/hr/channel | 1.2 | 4.5 | 4.5 |

For Comparative Example C, calculations are made of a practical-maximum production rate (about 370 thousand metric tons per annum, KTA) achievable in a devolatilization apparatus having a flat plate heater with a very large (368 cm [145 inches] total stack height) of 724 layers of plates and blocks and having the trumpet-like heating channels of U.S.

Pat. No. 5,453,158. For Examples 3 and 4, similar calculations are made to determine the size of a flat plate heater that would be capable of an equivalent devolatilization of the same polymer at higher rates, in each case using a flat plate heater having the bottle-like heating channels of this invention. The calculations for Example 3 show that the apparatus of this invention should be capable of a production rate (446 KTA) which is about 120% of the production rate (370 KTA) of Comparative Example C, with a stack height which is about 50% of the height of the stack in Comparative Example C. The calculations for Example 4 show that the apparatus of this invention should be capable of a production rate (925 KTA) which is 250% of the production rate (370 KTA) of Comparative Example C, with a stack height which is the same as the height of the stack in Comparative Example C.

While the invention has been described with respect to a limited number of embodiments, the specific features of one embodiment should not be attributed to other embodiments of the invention. No single embodiment is representative of all aspects of the invention. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

We claim:

1. A process for the devolatilization of a flowable material comprising a liquid or flowable solid, and at least one entrained or dissolved volatile component, which process comprises passing that flowable material through a devolatilization apparatus while operating under devolatilization conditions, wherein said devolatilization apparatus comprises:
   (a) a pump for supplying a pressurized flowable material comprising at least one molten polymer and at least one dissolved or entrained volatile component, which flowable material is characterized by a bubble point pressure which varies with the temperature of the flowable material,
   (b) a collection-and-volatile-separation vessel, and
   (c) a multiplicity of plates defining a plurality of heating channels, each heating channel having a substantially uniform height and having two zones consisting essentially of:
      a first zone having (1) an average hydraulic radius, and (2) an inlet adapted to receive the flowable material from the pump, and
      a second zone constituting the remainder of each said heating channel, which said second zone is adapted to receive the flowable material from the first zone and has at least one outlet adapted to discharge the flowable material into the collection-and-volatile-separation vessel, wherein the outlet of the second zone consists essentially of a smaller hydraulic radius than the average hydraulic radius of the first zone thereby resulting in a substantially complete flashing of the volatile components from the flowable material within the second zone, and wherein the ratio of the average hydraulic radius of the first zone to the hydraulic radius of the second zone having the smallest cross-sectional area is from 1.05:1 to 10:1; and
      wherein the design or operation of at least some of the heating channels is such that the pressure of the flowable material at essentially all positions within the first zone of those heating channels exceeds the bubble point pressure of the flowable material, and
   (d) a plurality of heating elements adapted to heat at least some of the plates so as to increase the temperature of the flowable material as it flows through the heating channels.

2. The process of claim 1 wherein the process separates the volatile component and produces a product having a residual concentration of the volatile component which is at least 90 percent less than concentration of the volatile component in the flowable material introduced into the devolatilization apparatus.

3. The process of claim 1 wherein the liquid or flowable solid component of the flowable material introduced into the devolatilization apparatus is selected from the group consisting of molten polymers, cheeses, chocolates, molasses, other flowable food products, waxes, heavy oils, tars, asphalts, other flowable construction materials, tree saps, pulp, paper, soaps, biomass, adhesives, pharmaceuticals, other viscous liquids, and any combination thereof.

4. The process of claim 1 wherein the flowable material introduced into the devolatilization apparatus comprises at least one molten polymer having a melt flow rate (I2) from about 0.3 to about 200 gm/10 minutes, and one or more volatile components selected from the group consisting of unreacted monomers, solvents, and unreacted comonomers, and combinations thereof.

5. The process of claim 4 wherein the polymer is selected from the group consisting of (i) homopolymers and copolymers of one or more vinylaromatic monomers and blends thereof with other polymers, and (ii) homopolymers and copolymers of one or more $C_2$ to $C_{10}$ olefins and blends thereof with other polymers, and wherein the substantially devolatilized product has a residual content of the volatile components of less than 2000 wppm.

6. In a method for the manufacture of a polymer from at least one monomer and optionally one or more comonomers in the presence of a supported or unsupported catalyst, wherein the polymer being produced is dissolved or suspended within a solvent, and wherein a flowable material comprising the polymer in molten form, the solvent, and one or more unreacted monomers or comonomers is processed to remove a majority of the solvent and unreacted monomer or comonomer from the molten polymer, the improvement comprising using a devolatilization apparatus to process the flowable material so as to produce a substantially devolatilized polymer product having a residual content of the solvent and the unreacted monomer or comonomer of less than 2000 wppm, wherein said devolatilization apparatus comprises:
   (a) a pump for supplying a pressurized flowable material comprising at least one molten polymer and at least one dissolved or entrained volatile component, which flowable material is characterized by a bubble point pressure which varies with the temperature of the flowable material,
   (b) a collection-and-volatile-separation vessel, and
   (c) a multiplicity of plates defining a plurality of heating channels, each channel having a substantially uniform height and having two zones consisting essentially of:
      a first zone having (1) an average hydraulic radius, and (2) an inlet adapted to receive the flowable material from the pump, and
      a second zone constituting the remainder of each channel, which second zone is adapted to receive the flowable material from the first zone and has at least one outlet adapted to discharge the flowable material into the collection-and-volatile-separation vessel, wherein the outlet of the second zone consists essentially of a smaller hydraulic radius than the average hydraulic radius of the first zone thereby resulting in a substantially complete flashing of the volatile components from the flowable material within the second zone, and wherein the ratio of the average hydraulic radius of the first zone to the hydraulic radius of the second zone having the smallest cross-sectional area is from 1.05:1 to 10:1; and wherein the design or operation of at least some of the heating channels is such that the pressure of the flowable material at essentially all positions within the first zone of those heating channels exceeds the bubble point pressure of the flowable material, and (d) a plurality of heating elements adapted to heat at least some of the plates so as to increase the temperature of the flowable material as it flows through the heating channels.

* * * * *